United States Patent [19]
Cunningham

[11] 3,711,153
[45] Jan. 16, 1973

[54] SEATS FOR MOTOR VEHICLES

[75] Inventor: Douglas James Cunningham, Chichester, England

[73] Assignee: Wingard Limited, Chichester, Sussex, England

[22] Filed: Feb. 12, 1971

[21] Appl. No.: 114,779

[30] Foreign Application Priority Data

Feb. 24, 1970 Great Britain..................8,929/70

[52] U.S. Cl. .................297/346, 297/216, 248/419
[51] Int. Cl. ..............................................B60n 1/02
[58] Field of Search ......297/346, 216; 248/395, 393, 248/419, 421, 423, 424, 377

[56] References Cited

UNITED STATES PATENTS

| 2,235,237 | 3/1941 | Saunders | 248/421 |
| 2,241,559 | 5/1941 | Schulz | 248/419 X |
| 1,677,434 | 7/1928 | Dorton | 297/364 |
| 2,227,717 | 1/1941 | Jones | 297/302 |
| 1,860,089 | 5/1932 | Ferris | 297/363 |
| 3,189,312 | 6/1965 | Bilancia | 297/346 X |
| 2,430,656 | 11/1947 | Wright | 248/419 |
| 2,272,536 | 2/1942 | Vofypka | 248/421 X |
| 2,219,456 | 10/1940 | Saunders | 248/419 |
| 3,136,524 | 6/1964 | Pickles | 248/424 |

Primary Examiner—Francis K. Zugel
Attorney—Scrivener Parker Scrivener and Clarke

[57] ABSTRACT

In a vehicle seat which is adjustable in a fore-and-aft direction the rear end of the seat frame is carried at each side by a support member which is pivotally connected to said frame and to a floor anchorage and is also selectively connected to the said frame at any one of a plurality of points spaced from their pivotal connection.

9 Claims, 6 Drawing Figures

PATENTED JAN 16 1973 3,711,153
SHEET 1 OF 4
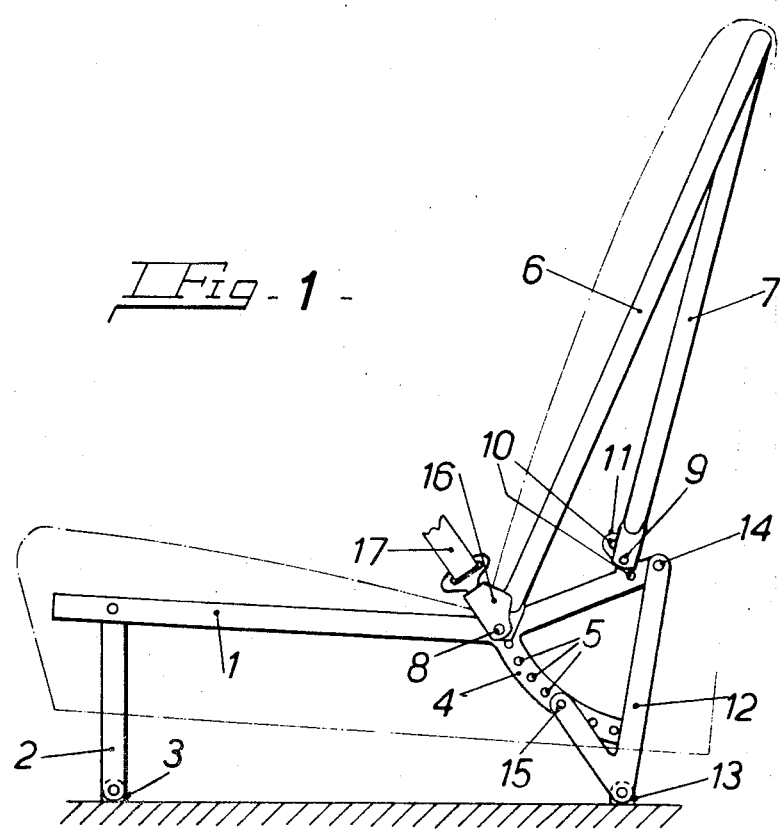
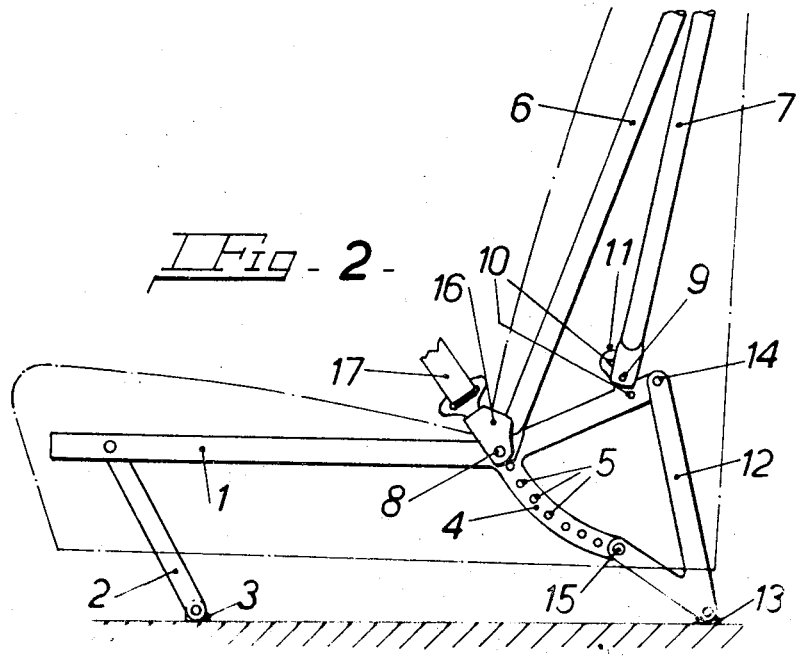

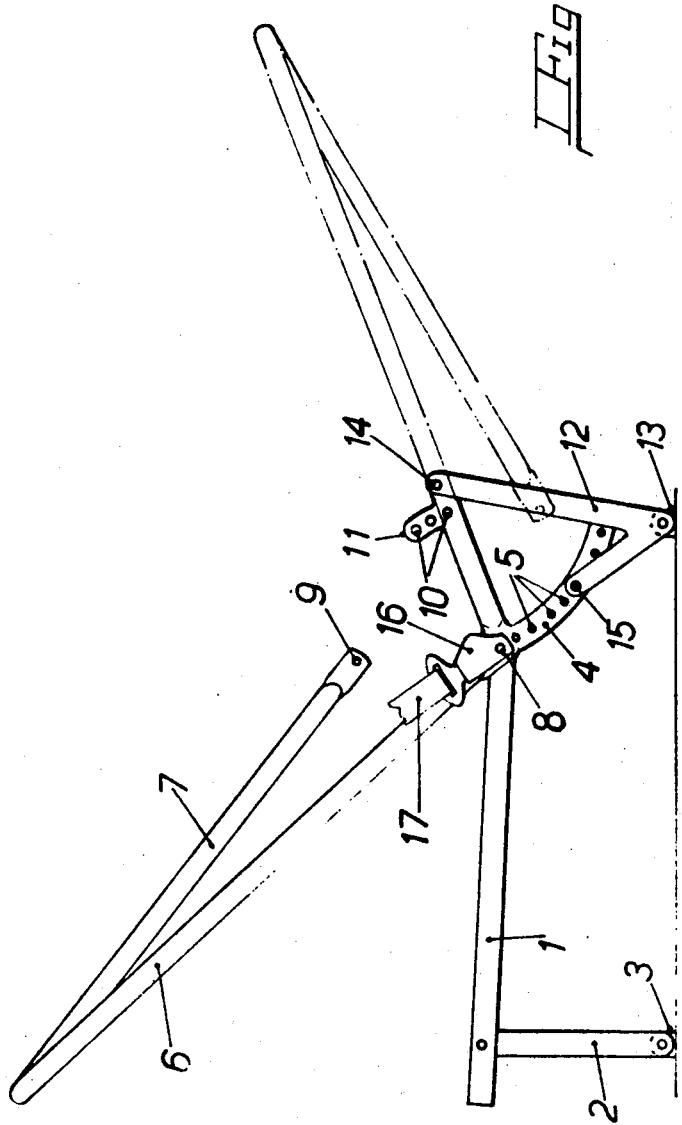

SEATS FOR MOTOR VEHICLES

This invention relates to improvements in seats for motor vehicles.

The usual front seats of a motor-car for the driver and front passenger are mounted on slides secured to the floor to provide fore-and-aft adjustment, releasable detents being provided for locating the seat in any position in which it is set. These detents have to take any inertia forces on the seat in the event of an accident or rapid deceleration of the vehicle, and they also have to take the inertia forces on the occupant of the seat unless he is located by a safety seat belt anchored to the floor or other part of the vehicle independently of the seat.

One of the objects of our invention is to provide a vehicle seat which is mounted on the floor of the vehicle in such a manner as to be capable of taking the full inertia forces to which the seat and its occupant are liable to be subjected and in which fore-and-aft adjustment of the seat is retained. Preferably, in addition, the seat back can be swung forwardly to give access to the rear seats in a two-door four-seater car and can also be swung over rearwardly into a reclining position.

In a seat for a vehicle according to our invention each side of a seat frame adjustable in a fore-and-aft direction is pivotally connected to a support member which is angularly movable about a floor anchorage, and means are provided for selectively connecting the seat frame to the support member at any one of a plurality of different points spaced from their pivotal connection.

A back for the seat preferably comprises a frame and inclined stays rigid with the frame, the back and stays being connected at each side to the seat frame and one of the connections being a pivot fixed relative to the seat frame while the other is adjustable to permit adjustment of the inclination of the back.

The front of the seat frame is conveniently supported by legs pivotally connected at their ends to the seat frame and to brackets fixed to the floor, or by pegs which are carried by upstanding lugs fixed to the floor and are adapted to slide in side members of the seat frame.

The seat frame may provide for the connection to it of one part of a releasable buckle of a safety seat belt assembly or for the attachment to it of some other part or parts of the assembly, any pull on the belt being transmitted through the seat frame and support member or members to the floor anchorage or anchorages for the support member or members.

In the accompanying drawings we have illustrated our invention diagrammatically and have also shown one practical example of a car seat embodying our invention in these drawings:

FIGS. 1 to 4 are side elevations in diagrammatic form of a car seat shown in different positions;

Figure 3:
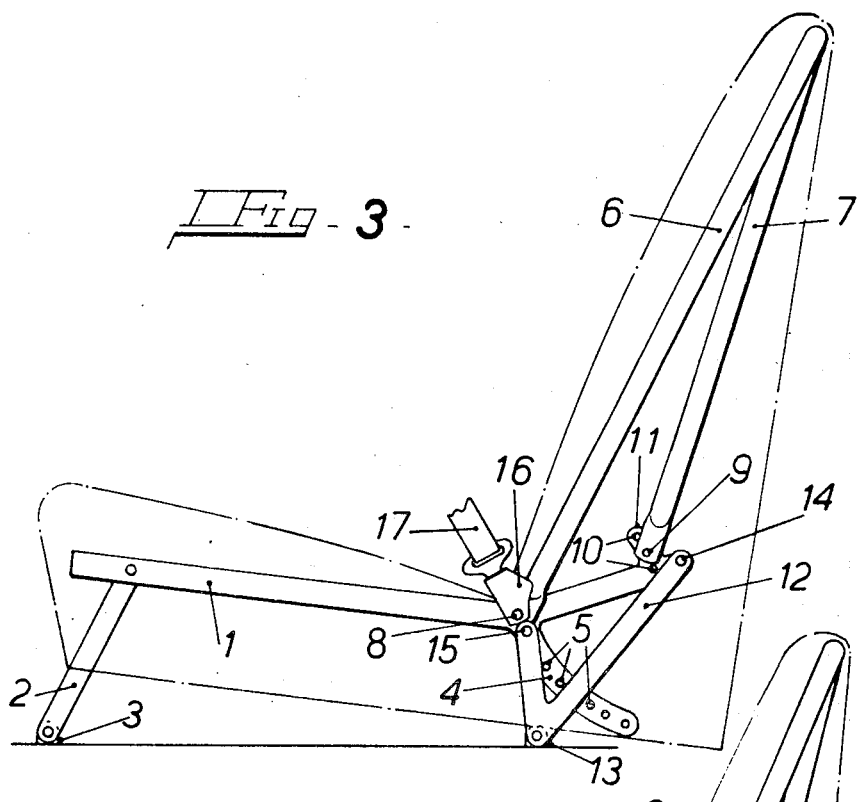

The seat shown in FIGS. 1 to 4 comprises a substantially horizontal seat frame 1 of generally U outline in plan which is supported at its front end by legs 2 pivoted at their upper ends to the side members of the frame and at their lower ends to brackets on lugs 3 secured to the floor.

Adjacent to the rear end of each side member there is a rigid downwardly and rearwardly extending quadrant 4 pierced with angularly spaced holes 5. The rear end of the side member beyond the quadrant is shown as being inclined upwardly at a small angle to the horizontal but it may be in line with the front part.

The seat back comprises a tubular or other frame 6 of inverted U outline with rigid stays 7 inclined rearwardly at a small angle to the frame and extending downwardly from the upper end of the frame. The lower ends of the frame are pivotally connected by pins 8 to each side member of the seat frame at the junction of the quadrant 4 with the side member, and the lower end of each stay is connected to a side member by a pin 9 passed through any one of a number of spaced holes 10 in a lug 11 projecting upwardly from the side member adjacent to its rear end so that the inclination of the seat back can be readily adjusted by moving the pins 9 at each side to other holes. The upper horizontal portion of the back frame may carry means for the attachment to it of one or more parts of a seat belt assembly.

The seat assembly is completed by two rear support members 12 located one on each side of the rear end of the seat. Each rear support member is a rigid member of Vee outline and is pivotally mounted at the junction of the limbs in a bracket 13 secured to the floor.

The free upper end of the rear limb of the support member is pivotally connected by a pin 14 to the rear end of the adjacent side member of the seat frame, and the free end of the forward limb, which is shorter than the rear limb, is connected to the quadrant 4 by a readily removable pin 15 which can be passed through any one of the holes 5.

In the normal position of the seat, shown in FIG. 1, the front legs 2 are substantially vertical, the back is inclined rearwardly at a small angle, and the pin 15 connecting the forward limb of the support member 12 to the quadrant 4 is located in a hole about the mid point of the quadrant.

A part 16 of a two-part buckle of a safety belt 17 is preferably attached to or mounted on the pin 8 connecting the back frame to the seat frame and any pull on the belt is taken directly by the floor anchorage 13 for the rear support member through the pin 15 connecting the forward limb of the support member and the quadrant which lies substantially in a straight line between the anchorage 13 and the pin 8. Another part of the belt, as for example the other end of the lap part of a lap and diagonal belt, may be attached to the pin 28 on the other side of the seat.

To move the seat forwardly into the position shown in FIG. 2 the pins 15 on each side are withdrawn and re-engaged in holes 5 nearer the free ends of the quadrants. This rocks the rear supports 12 and front legs 2 over forwardly.

To move the seat rearwardly into the position shown in FIG. 3 the pins 15 are withdrawn and re-engaged in holes 5 on the quadrants nearer their junction with the side members of the seat frame so that the support members and front legs are rocked over rearwardly.

By disengaging the pins 14 connecting the back stays 7 to the side members of the seat frame the back can be swung over forwardly into the position shown in full lines in FIG. 4 to give access to the rear seats in a two-door car, or the back can be swung over rearwardly into the reclining position shown in chain dotted lines.

Figure 5:
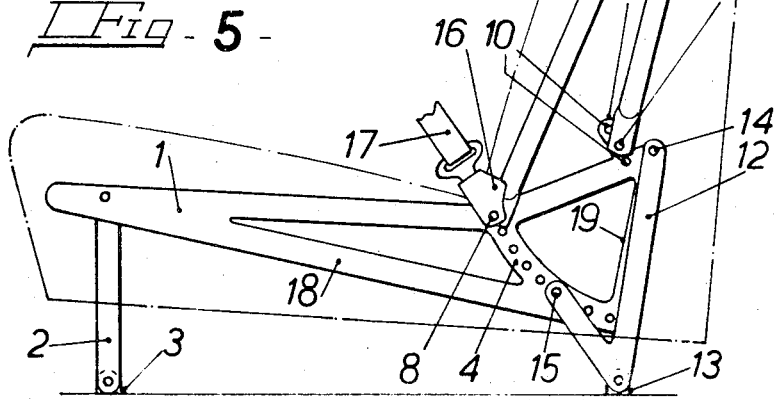
FIG. 5 is a similar side elevation showing a slight modification.

In the modification shown in FIG. 5, in order to provide additional strength each side member of the seat frame 1 is stiffened by a stay 18 extending rearwardly and downwardly from the front end of the side member to meet a stay 19 extending downwardly from its rear end. The quadrant 4 extends between the side member and the junction of the stays so that the various members combine to form a rigid triangulated structure.

Figure 6:
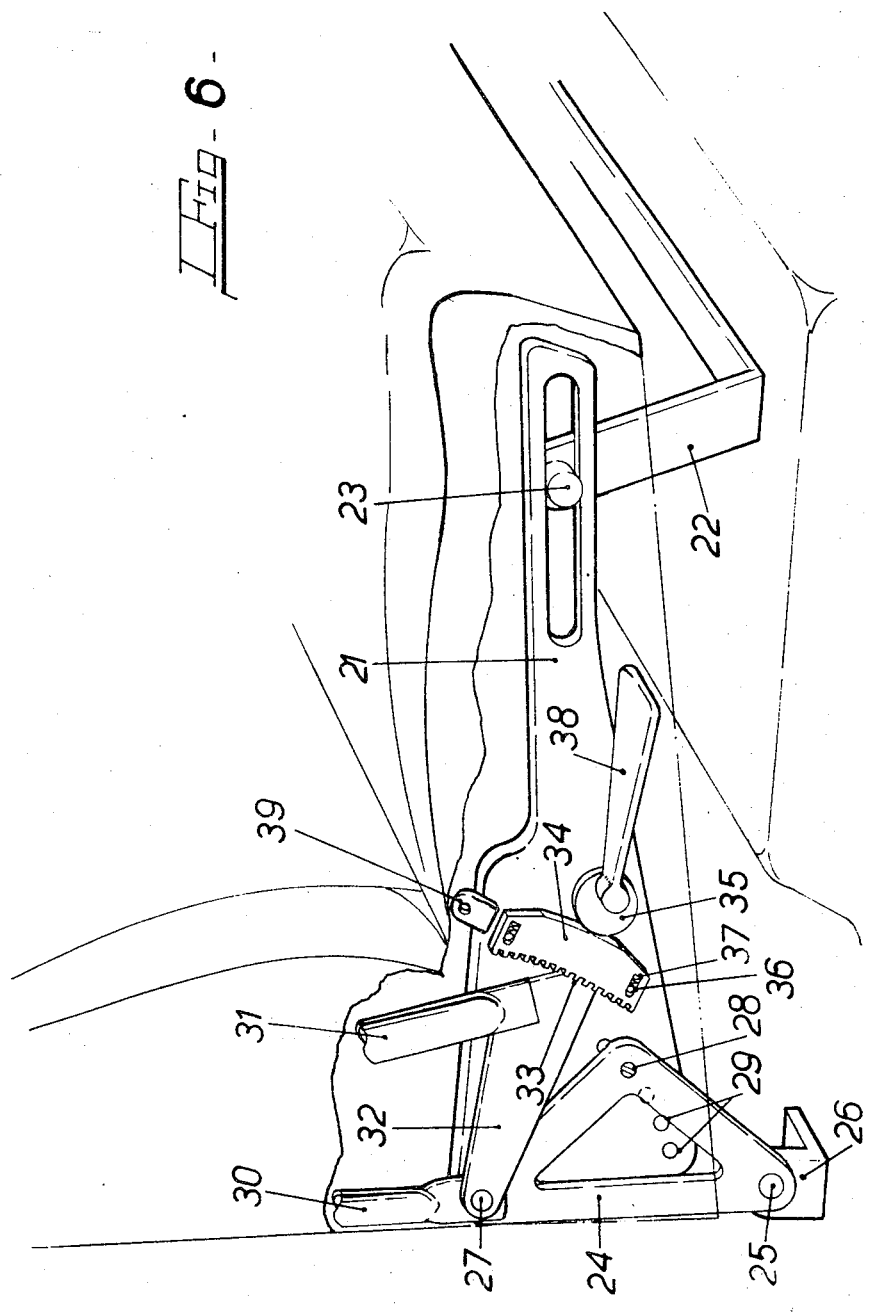
FIG. 6 is a perspective view of one practical form of car seat.

In the practical design of seat shown in FIG. 6 each side member of the seat frame and the corresponding quadrant have been combined as a unitary member 21 which may conveniently be formed as a sheet metal pressing stiffened by a peripheral flange.

At its front end the member 21 may be supported by a pivoted leg as in the diagrammatic arrangement described above or it may be supported as shown by a stationary lug 22 carrying a peg 23 working in a horizontal slot in the member 21.

The Vee-shaped rear support member 12 has been replaced by a triangular pressing 24 pivotally mounted at its lower corner by a pin 25 on a bracket 26 secured to the floor. The upper rear corner of the support member is pivotally connected by a pin 27 to the rear end of the side member 21. The front corner of the support member is selectively connected by a pin 28 to any one of a series of holes 29 formed in the side member 21 and arranged in an arc with the pin 27 as its center. The pins 28 on opposite sides of the seat are adapted to be retracted and re-engaged simultaneously by any convenient mechanism (not shown) located below the seat and operated by a handle at the front of the seat. This mechanism may be of the kind commonly used for operating locking pegs engaging in holes in the guide members of sliding seats. In an alternative arrangement the pins 28 may be operated by power means controlled by a push button or lever located at any convenient point.

The main frame 30 of the back is a length of tube bent to the form of an inverted U, and the free end of each limb is flattened and is pivotally connected to the adjacent side member 21 and the support member 24 by the pin 27. Stays 31 located in front of the main frame of the back are welded at their upper ends to that frame and the lower end of each stay is flattened and welded to a rearwardly extending plate 32 which at its rear end is also engaged by the pivot pin 27. Obviously the plate 32 could be welded to the lower ends of both the back frame and the stay if this should be desirable for strength.

The lower part of the plate 32 at its front end is formed as a short arc 33 with the pin 27 as its center, and teeth on the arcuate part 33 are adapted to engage with complementary teeth on an arcuate rack 34. This rack is mounted to slide on the side member and is normally held in engagement with the teeth on the plate 32 by a cam or eccentric 35. The eccentric is mounted on one end of a transverse spindle extending under the seat and carrying a corresponding eccentric on its other end for acting on a rack on the opposite side member. The rack is guided by pegs 36 on the side member 21 engaging in slots in the rack, and springs 37 housed in the slots and bearing on the pins move the teeth on the rack out of engagement with those on the plate 32 when the eccentric 35 is rotated into a releasing position by means of a handle 38. The angle of the back can then be adjusted as desired and it is locked in that position by returning the eccentric to its locking position.

Fore-and-aft movement of the seat is effected by withdrawing the pins 28 and re-engaging them in different holes 29 after the seat has been moved into the required position, the support members 24 moving angularly about the pins 25 and the pegs 23 sliding in the slots in the side members as the seat moves forwardly or rearwardly.

A lug 39 may be welded or otherwise secured to one or each of the side members 21 to receive an attachment for a safety seat belt assembly such as one part of a releasable buckle, the positions of the lugs being such that any pull on the belt is taken by the anchorages 26 through the pins 28 which connect the side members of the seat frame to the support members 24 and which in the normal position of the seat are substantially in line with the lugs 39 and the anchorage 26.

As the seat itself is capable of withstanding any inertia forces to which it is liable to be subjected the upper end of the diagonal strap of a lap and diagonal seat belt may be attached to the upper end of the back frame of the seat instead of to an anchorage on the body side or pillar.

All the adjusting mechanism for the seat can be concealed within the upholstery of the seat and back, the only part which need project being the handle 38.

I claim:

1. A vehicle seat which is adjustable in a fore-and-aft direction and comprises a seat frame and a back frame wherein the rear end of the seat frame is pivotally connected at each side to a support member which is pivotally connected to a floor anchorage and is also connected to the support member by a releasable pin extending through a hole in the support member and through any selected one of a series of holes in the frame concentric about and spaced from the pivotal connection between the frame and the support member, the support member incorporating at least one part which is inclined forwardly from the floor anchorage in all selected position of the seat and in which said hole is located in order that inertia forces on the seat in the event of sudden deceleration of the vehicle are taken in tension by the seat frame and support member.

2. A vehicle seat as in claim 1 wherein the forwardly inclined part is inextensible.

3. A vehicle seat as in claim 1 wherein the front of the seat frame is supported by pegs which are carried by upstanding legs fixed to the floor and are adapted to slide in slots in the seat frame.

4. A vehicle seat as in claim 2 wherein the releasable pins on both sides of the seat are operated by means located below the seat and actuated from a convenient point.

5. A vehicle seat as in claim 1 wherein a frame for a back has a pivotal connection at its lower end with the seat frame and a stay rigidly secured to the back frame and inclined at a small angle thereto is connected to the seat frame at a point spaced from said pivotal connection by adjustable means providing for angular adjustment of the back frame about said pivotal connection.

6. A vehicle seat as in claim 5 wherein said means for adjustably connecting the stay to the seat frame are releasable to allow the back frame to be swung over forwardly and rearwardly through a substantial angle about its pivotal connection to the seat frame.

7. A vehicle seat as in claim 5 wherein the pivotal connections between the seat frame and the support member and between the back frame and the seat frame are formed by a common pin.

8. A vehicle seat as in claim 1 wherein the front of the seat frame is supported by legs of which opposite ends are pivotally connected to the seat frame and to brackets fixed to the floor.

9. A vehicle seat as in claim 1 wherein one or each side member of the seat frame incorporates means for the connection to it of a part of a safety belt assembly, the position of the connection or connections being such that a pull on the belt is transmitted to the floor anchorages for the support members.

* * * * *